United States Patent
Chen

(10) Patent No.: US 9,982,613 B2
(45) Date of Patent: May 29, 2018

(54) VEHICLE, CONTROL DEVICE AND CONTROL METHOD THEREOF

(71) Applicants: LITE-ON ELECTRONICS (GUANGZHOU) LIMITED, Guangzhou (CN); LITE-ON TECHNOLOGY CORP., Taipei (TW)

(72) Inventor: Cheng-An Chen, Taipei (TW)

(73) Assignees: LITE-ON ELECTRONICS (GUANGZHOU) LIMITED, Guangzhou (CN); LITE-ON TECHNOLOGY CORP., Taipei (TW)

(*) Notice: Subject to any disclaimer, the term of this patent is extended or adjusted under 35 U.S.C. 154(b) by 0 days. days.

(21) Appl. No.: 15/272,821

(22) Filed: Sep. 22, 2016

(65) Prior Publication Data
US 2017/0268446 A1   Sep. 21, 2017

(30) Foreign Application Priority Data
Mar. 16, 2016 (CN) .......................... 2016 1 0151128

(51) Int. Cl.
*F02D 41/04* (2006.01)
*F02D 41/08* (2006.01)
*F02D 41/06* (2006.01)

(52) U.S. Cl.
CPC ......... *F02D 41/065* (2013.01); *F02D 41/042* (2013.01); *F02D 41/08* (2013.01); *F02D 2200/021* (2013.01); *F02D 2200/101* (2013.01); *F02D 2200/501* (2013.01); *F02D 2200/602* (2013.01)

(58) Field of Classification Search
CPC ...... F02D 41/065; F02D 41/042; F02D 41/08; F02D 2200/021; F02D 2200/101; F02D 2200/501; F02D 2200/602
USPC ........................... 701/112; 123/179.4, 179.3
See application file for complete search history.

(56) References Cited

U.S. PATENT DOCUMENTS

| | | | |
|---|---|---|---|
| 2006/0011163 A1* | 1/2006 | Watanabe | F02D 41/042 123/179.4 |
| 2015/0148192 A1* | 5/2015 | Lyon | B60W 10/184 477/203 |

* cited by examiner

*Primary Examiner* — Mahmoud Gimie
(74) *Attorney, Agent, or Firm* — Rosenberg, Klein & Lee

(57) ABSTRACT

A vehicle includes a first sensor, a second sensor, an engine, a fuel supplying device, and a control device. The control device includes a first sensor detecting unit, a second sensor detecting unit, a vehicle status detecting unit, and a control unit. The control unit is switchable among a regular state, a start-stop enabling state, and an idling-stop state. The control unit switches into the start-stop enabling state from the regular state once the control unit determines that the first sensor and the second sensor are both triggered. The control unit further switches into the idling-stop state and controls the fuel supplying device to stop supplying fuel once the control unit determines that the vehicle status meets an idling-stop condition.

19 Claims, 2 Drawing Sheets

VEHICLE, CONTROL DEVICE AND CONTROL METHOD THEREOF

CROSS-REFERENCE TO RELATED APPLICATION

This application claims priority of Chinese Patent Application No. 201610151128.7, filed on Mar. 16, 2016.

FIELD

The disclosure relates to a vehicle, and more particularly to a vehicle installed with a control device, the control device, and a control method for controlling the vehicle.

BACKGROUND

In order to reduce fuel consumption and emissions, a conventional vehicle, for example, a scooter, may be provided with start-stop functionality, wherein an engine of the scooter is automatically shut down and restarted when the start-stop function is activated, in order to reduce the amount of time the engine spends idling.

Conventionally, a manual switch is provided on the scooter for a user to manually activate the start-stop function. However, the manual switch increases not only the cost of manufacture of the scooter, but also the complexity of the operating interface for activating the start-stop function. Thus, it is a primary issue in the field to provide another approach to realize the start-stop function for the conventional vehicle.

SUMMARY

Therefore, an object of the disclosure is to provide a vehicle with start-stop functionality, a control device, and a control method thereof. An object of the disclosure is to utilize existing operating interface to implement the activation of the start-stop functionality, in hopes of reducing cost of manufacture and complexity of operation.

According to one aspect of the disclosure, the vehicle includes a first sensor, a second sensor, an engine, a fuel supplying device operable to supply the engine with fuel, and a control device. The control device includes a first sensor detecting unit, a second sensor detecting unit, a vehicle status detecting unit, and a control unit. The first sensor detecting unit is configured to detect whether the first sensor is triggered. The second sensor detecting unit is configured to detect whether the second sensor is triggered. The vehicle status detecting unit is configured to detect a vehicle status associated with the vehicle. The control unit is electrically coupled to the first sensor detecting unit, the second sensor detecting unit, the vehicle status detecting unit and the fuel supplying device. The control unit is switchable among a regular state, a start-stop enabling state, and an idling-stop state. When the engine is running with the fuel supplied by the fuel supplying device and the control unit is in the regular state, the control unit switches into the start-stop enabling state once the control unit determines that the first sensor and the second sensor are both triggered according to detection results from the first sensor detecting unit and the second sensor detecting unit. When the control unit is in the start-stop enabling state, the control unit switches into the idling-stop state and controls the fuel supplying device to stop supplying fuel to the engine once the control unit determines that the vehicle status detected by the vehicle status detecting unit meets an idling-stop condition.

According to another aspect of the disclosure, a control device is provided to be installed in a vehicle. The vehicle includes a first brake, a second brake, an engine, and a fuel supplying device operable to supply the engine with fuel. The control device includes a first brake detecting unit configured to detect whether the first brake is triggered, a second brake detecting unit configured to detect whether the second brake is triggered, a vehicle status detecting unit configured to detect a vehicle status associated with the vehicle, and a control unit electrically coupled to the first brake detecting unit, the second brake detecting unit, and the vehicle status detecting unit, and switchable among a regular state, a start-stop enabling state, and an idling-stop state. When the engine is running and that the control unit is in the regular state, the control unit switches into the start-stop enabling state once the control unit determines that the first brake and the second brake are both triggered according to detection results from the first brake detecting device and the second brake detecting device. When the control unit is in the start-stop enabling state, the control unit switches into the idling-stop state and controls the fuel supplying device to stop supplying fuel to the engine once the control unit determines that a vehicle status detected by the vehicle status detecting unit meets an idling-stop condition.

According to yet another aspect of this disclosure, a control method for controlling a vehicle is provided. The vehicle includes a first brake, a second brake, an engine, a fuel supplying device operable to supply the engine with fuel, and a control unit. The control method includes the steps of:

when the engine is running and that the control unit is in a regular state, switching the control unit into a start-stop enabling state once the first brake and the second brake are both triggered, and when the control unit is in the start-stop enabling state, switching the control unit into an idling-stop state and controlling the fuel supplying device to stop supplying fuel to the engine once a vehicle status of the vehicle meets an idling-stop condition.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
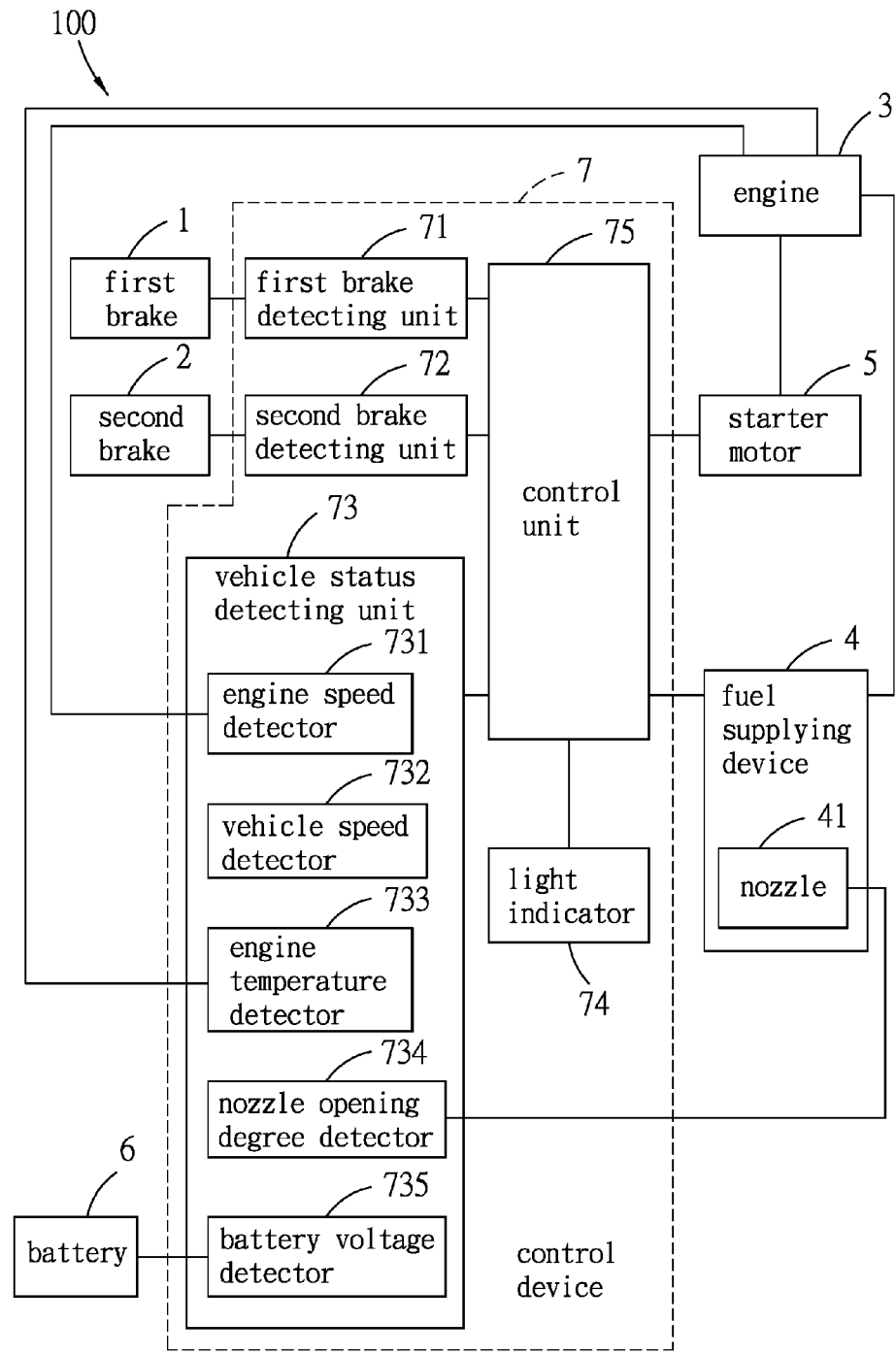
FIG. 1 is a block diagram illustrating an embodiment of a vehicle including a control device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a vehicle 100 is described below. The vehicle 100 includes a first brake 1 that serves as a first sensor, a second brake 2 that serves as a second sensor, an engine 3, a fuel supplying device 4 operable to supply the engine 3 with fuel and including a nozzle, a starter motor 5 coupled to the engine 3, and a control device 7, and is installed with a battery 6. In one embodiment, the vehicle 100 may be a scooter, an automobile or other machine that may transport people or cargo, which does not limit the scope of the present invention.

The control device 7 includes a first brake detecting unit 71 that serves as a first sensor detecting unit, a second brake detecting unit 72 that serves as a second sensor detecting unit, a vehicle status detecting unit 73, a light indicator 74, and a control unit 75. The first brake detecting unit 71 is configured to detect whether the first brake 1 is triggered. The second brake detecting unit 72 is configured to detect whether the second brake 2 is triggered. The vehicle status detecting unit 73 is configured to detect a vehicle status associated with the vehicle 100. The control unit 75 is electrically coupled to the first brake detecting unit 71, the second brake detecting unit 72, the vehicle status detecting unit 73, the light indicator 74, the fuel supplying device 4, and the starter motor 5. The control unit 75 can be switched between two or more states, such as a regular state, a start-stop enabling state, an idling-stop state, and a start standby state.

The vehicle status detecting unit 73 includes an engine speed detector 731, a vehicle speed detector 732, an engine temperature detector 733, a nozzle opening degree detector 734, and a battery voltage detector 735. The engine speed detector 731 is configured to detect an engine speed of the engine 3. The vehicle speed detector 73 is configured to detect a vehicle speed of the vehicle 100. The engine temperature detector 733 is configured to detect a temperature of the engine 3. The nozzle opening degree detector 734 is configured to detect an opening degree of the nozzle 41 of the fuel supplying device 4. The battery voltage detector 735 is configured to determine a voltage of the battery 6 installed in the vehicle 100.

In one embodiment, under a condition that the engine 3 is running with the fuel supplied by the fuel supplying device 4 and that the control unit 75 is in the regular state, in which the light indicator 74 indicates a first status (e.g., constantly on or non-blinking light), the control unit 75 switches into the start-stop enabling state from the regular state once the control unit 75 determines that the first brake 1 and the second brake 2 are both triggered according to detection results from the first brake detecting unit 71 and the second brake detecting unit 72.

In one embodiment, when the control unit 75 is in the start-stop enabling state, the control unit 75 switches into the idling-stop state, in which the light indicator 74 indicates a second status (e.g., blinking light), from the start-stop enabling state once the control unit 75 determines that the vehicle status meets an idling-stop condition. While in the idling-stop state, the control unit 75controls the fuel supplying device 4 to stop supplying fuel to the engine 3.

In detail, the idling-stop condition is met when the vehicle 100 is in an idle speed status. In this embodiment, the idling-stop condition may be met when the control unit 75 determines that (i) the engine speed (detected by the engine speed detector 731) is smaller than a threshold value, for example, 2000 rpm (revolutions per minute), for a predetermined period of time, for example, 3 seconds; (ii) the vehicle speed (detected by the vehicle speed detector 732) is smaller than a threshold value, for example, 5 km/hr, for the predetermined period of time; (iii) the temperature (detected by the engine temperature detector 733) is greater than a threshold value, for example, 68 degrees Celsius, for the predetermined period of time; (iv) the opening degree (detected by the nozzle opening degree detector 734) is smaller than a threshold value, for example, 2%, for the predetermined time; or (v) the voltage (detected by the battery voltage detector 735) is greater than a threshold value, for example, 12.6 V. It is understood that those skilled in the art may adaptively add/delete/adjust/replace the detections mentioned above, which is also within the scope of the present invention.

In one embodiment, when the control unit 75 is in the idling-stop state, the control unit 75 switches into the start standby state from the idling-stop state once the control unit 75 determines that the first brake 1 and the second brake 2 are both triggered. Either brake is considered triggered according to the detection results from the first brake detecting unit 71 and the second brake detecting unit 72.

In one embodiment, when the control unit 75 is in the start standby state, the control unit 75 switches into the regular state from the start standby state and the control unit 75 controls the starter motor 5 to activate the engine 3 once the control unit 75 determines that the vehicle status (detected by the vehicle status detecting unit 73) meets an activating condition.

In detail, the activating condition is met when the vehicle 100 is in a standstill status. In one implementation, the activating condition is met when the control unit 75 determines that the vehicle speed detected by the vehicle speed detector 732 is smaller than a threshold value for a predetermined period of time.

Figure 2:
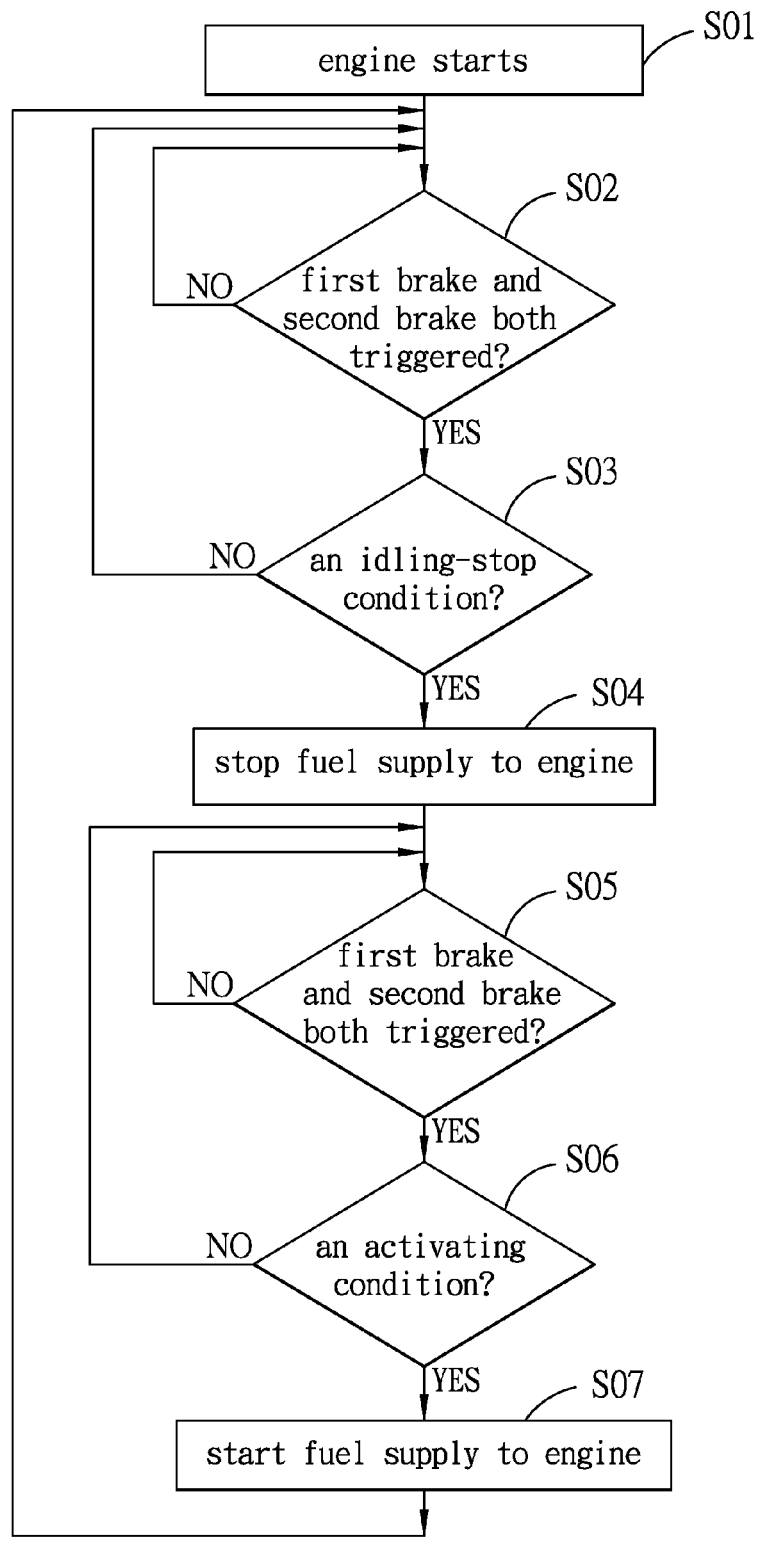
FIG. 2 is a flow diagram illustrating an embodiment of a control method for controlling a vehicle according to this disclosure.

An exemplary embodiment of a control method for controlling the vehicle 100 described in FIG. 1 is disclosed to include the steps below with reference to FIG. 2.

In step S01, the user starts the vehicle 100 so that the engine 3 starts running and the control unit 75 is in the regular state. Meanwhile, the control unit 75 makes the light indicator 74 show the first status such as to constantly emit light.

Next, in step S02, the control unit 75 determines whether the first and second brakes 1, 2 are both triggered based on detection results from the first and second brake detecting units 71, 72.

In the affirmative, the flow proceeds to step S03, in which the control unit 75 is switched into the start-stop enabling state from the regular state, and determines whether the vehicle status of the vehicle 100 meets the idling-stop condition. In the negative, the flow goes back to step S02.

When the determination made in step S03 is affirmative, the flow proceeds to step S04, in which the control unit 75 is switched into the idling-stop state from the start-stop enabling state, and the fuel supplying device 4 is stopped (e.g., to stop supplying fuel to the engine 3). Meanwhile, the control unit 75 will make the light indicator 74 show the second status such as to emit blinking light. When the determination made in step S03 is negative, the flow goes back to step S02.

Following step S04, in step S05, the control unit 75 determines whether the first and second brakes 1, 2 are both triggered based on the detection results from the first and second brake detecting units 71, 72. In the affirmative, the flow proceeds to step S06, in which the control unit 75 is switched into the start standby state from the idling-stop state; in the negative, the flow goes back to step S05.

Instep S06, the control unit 75 determines whether the vehicle status of the vehicle meets the activating condition. In the affirmative, the flow goes to step S07, in which the control unit 75 is switched into the regular state from the start standby state, and the fuel supplying device 4 is controlled to start supplying fuel to the engine 3. Meanwhile, the control unit 75 controls the light indicator 74 to constantly emit light. Otherwise, in the event that the vehicle status of the vehicle does not meet the activating condition, the flow goes back to step S05.

After step S07, the flow goes back to step S02.

It is noted that the idling-stop condition and the activating condition for the method may be similar to the idling-stop condition and the activating condition described previously in connection with the vehicle 100, which is omitted herein for brevity. Moreover, one purpose of implementing step S06 is to ensure safety by preventing the vehicle 100 from restarting while, e.g., a user walks the scooter. In another example, after step S07, a mechanism may be implemented before the flow goes back to step S02, so that the control unit 75 is only allowed to switch into the start-stop enabling state again after the vehicle 100 travels a predetermined distance. With this mechanism in place, the service life of the engine 3 may be increased since the wear-and-tear due to repeated starting and stopping cycles in view of repeated switching of the control unit 75 among the states is decreased.

In sum, control for switching the control unit 75 into the start-stop enabling state from the regular state is implemented by triggering both the first brake 1 and the second brake 2. The same goes for switching the control unit 75 into the start standby state from the idling-stop state. Accordingly, an additional physical switch may be omitted, and the interface for switching the statuses of the control unit is simple. Any regular vehicle maybe applied with the start-stop functionality by simply being configured by means of, e.g., software or firmware, to implement the control method of this disclosure.

In the description above, for the purposes of explanation, numerous specific details have been set forth in order to provide a thorough understanding of the embodiment(s). It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connect ion with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle comprising:
  a first brake defining a first sensor;
  a second brake defining a second sensor;
  an engine;
  a fuel supplying device operable to supply said engine with fuel; and
  a control device including
    a first sensor detecting unit configured to detect whether said first sensor is triggered,
    a second sensor detecting unit configured to detect whether said second sensor is triggered,
    a vehicle status detecting unit configured to detect a vehicle status associated with the vehicle, and
    a control unit electrically coupled to said first sensor detecting unit, said second sensor detecting unit, said vehicle status detecting unit and said fuel supplying device, and switchable among a regular state, a start-stop enabling state, and an idling-stop state;
  wherein, when said engine is running with the fuel supplied by said fuel supplying device and said control unit is in the regular state, said control unit switches into the start-stop enabling state once said control unit determines that said first sensor and said second sensor are both concurrently triggered according to detection results from said first sensor detecting unit and said second sensor detecting unit, and
  wherein, when said control unit is in said start-stop enabling state, said control unit switches into the idling-stop state and controls said fuel supplying device to stop supplying fuel to said engine once said control unit determines that the vehicle status detected by said vehicle status detecting unit meets an idling-stop condition.

2. The vehicle as claimed in claim 1, wherein the idling-stop condition is met when the vehicle is in an idle speed status.

3. The vehicle as claimed in claim 1, wherein said fuel supplying device includes a nozzle, and said vehicle status detecting unit includes:
  an engine speed detector configured to detect an engine speed of said engine,
  a vehicle speed detector configured to detect a vehicle speed of the vehicle,
  an engine temperature detector configured to detect a temperature of said engine,
  a nozzle opening degree detector configured to detect an opening degree of said nozzle of said fuel supplying device, and
  a battery voltage detector configured to detect a voltage of a battery installed in the vehicle,
  wherein the idling-stop condition is met when said control unit determines that:
    the engine speed detected by said engine speed detector is smaller than an engine speed threshold for a predetermined time,
    the vehicle speed detected by said vehicle speed detector is smaller than a vehicle speed threshold for the predetermined time,
    the temperature detected by said engine temperature detector is greater than an engine temperature threshold for the predetermined time,
    the opening degree detected by said nozzle opening degree detector is smaller than a nozzle opening degree threshold for the predetermined time, and
    the voltage detected by said battery voltage detector is greater than a battery voltage threshold.

4. The vehicle as claimed in claim 1, further comprising a starter motor coupled to said engine and said control unit,
  wherein said control unit is further switchable into a start standby state,
  wherein, when said control unit is in said idling-stop state, said control unit switches into the start standby state once said control unit determines that said first sensor and said second sensor are both triggered according to the detection results from said first sensor detecting unit and said second sensor detecting unit, and
  wherein, when said control unit is in said start standby state, said control unit switches into the regular state and said control unit controls said starter motor to activate said engine once said control unit determines that the vehicle status detected by said vehicle status detecting unit meets an activating condition.

5. The vehicle as claimed in claim 4, wherein the activating condition is met when the vehicle is in a standstill status.

6. The vehicle as claimed in claim 4, wherein said vehicle status detecting unit includes a vehicle speed detector configured to detect a vehicle speed of the vehicle, and the activating condition is met when said control unit determines that the vehicle speed detected by said vehicle speed detector is smaller than a vehicle speed threshold.

7. The vehicle as claimed in claim 4, wherein said fuel supplying device includes a nozzle, and said vehicle status detecting unit includes:
an engine speed detector configured to detect an engine speed of said engine,
a vehicle speed detector configured to detect a vehicle speed of the vehicle,
an engine temperature detector configured to detect a temperature of said engine,
a nozzle opening degree detector configured to detect an opening degree of said nozzle of said fuel supplying device, and
a battery voltage detector configured to determine a voltage of a battery installed in the vehicle,
wherein the idling-stop condition is met when said control unit determines:
that the engine speed detected by said engine speed detector is smaller than an engine speed threshold for a predetermined time,
that the vehicle speed detected by said vehicle speed detector is smaller than a vehicle speed threshold for the predetermined time,
that the temperature detected by said engine temperature detector is greater than an engine temperature threshold for the predetermined time,
that the opening degree detected by said nozzle opening degree detector is smaller than a nozzle opening degree threshold for the predetermined time, and
that the voltage detected by said battery voltage detector is greater than a battery voltage threshold.

8. A control device to be installed in a vehicle, the vehicle including a first brake, a second brake, an engine, and a fuel supplying device operable to supply the engine with fuel, the control device comprising:
a first brake detecting unit configured to detect whether the first brake is triggered,
a second brake detecting unit configured to detect whether the second brake is triggered,
a vehicle status detecting unit configured to detect a vehicle status associated with the vehicle, and
a control unit electrically coupled to said first brake detecting unit, said second brake detecting unit, and said vehicle status detecting unit, and switchable among a regular state, a start-stop enabling state, and an idling-stop state;
wherein, when the engine is running and said control unit is in the regular state, said control unit switches into the start-stop enabling state once said control unit determines that the first brake and the second brake are both concurrently triggered according to detection results from said first brake detecting device and said second brake detecting device, and
wherein, when said control unit is in said start-stop enabling state, said control unit switches into the idling-stop state and controls the fuel supplying device to stop supplying fuel to the engine once said control unit determines that a vehicle status detected by said vehicle status detecting unit meets an idling-stop condition.

9. The control device as claimed in claim 8, wherein the idling-stop condition is met when the vehicle is in an idling-stop status.

10. The control device as claimed in claim 8, wherein said vehicle status detecting unit includes:
an engine speed detector configured to determine an engine speed of the engine,
a vehicle speed detector configured to determine a vehicle speed of the vehicle,
an engine temperature detector configured to detect a temperature of the engine,
a nozzle opening degree detector configured to determine an opening degree of a nozzle of the fuel supplying device, and
a battery voltage detector configured to determine a voltage of a battery installed in the vehicle,
wherein the idling-stop condition is met when said control unit determines:
that the engine speed detected by said engine speed detector is smaller than an engine speed threshold for a predetermined time,
that the vehicle speed detected by said vehicle speed detector is smaller than a vehicle speed threshold for the predetermined time,
that the temperature detected by said engine temperature detector is greater than an engine temperature threshold for the predetermined time,
that the opening degree detected by said nozzle opening degree detector is smaller than a nozzle opening degree threshold for the predetermined time, and
that the voltage detected by said battery voltage detector is greater than a battery voltage threshold.

11. The control device as claimed in claim 8, wherein said control unit is further switchable into a start standby state,
wherein, when said control unit is in the idling-stop state, said control unit switches into the start standby state once said control unit determines that the first brake and the second brake are both triggered according to the detection results from said first brake detecting unit and said second brake detecting unit, and
wherein, when said control unit is in the start standby state, said control unit switches into the regular state and said control unit controls a starter motor of the vehicle to activate the engine once said control unit determines that the vehicle status detected by said vehicle status detecting unit meets an activating condition.

12. The control device as claimed in claim 11, wherein the activating condition is met when the vehicle is in a standstill status.

13. The control device as claimed in claim 11, wherein said vehicle status determining unit includes a vehicle speed detector configured to determine a vehicle speed of the vehicle, and the activating condition is met when said control unit determines that the vehicle speed detected by said vehicle speed detector is smaller than a vehicle speed threshold.

14. A control method for controlling a vehicle, the vehicle including a first brake, a second brake, an engine, a fuel supplying device operable to supply the engine with fuel, and a control unit, said control method comprising:

when the engine is running and the control unit is in a regular state, switching the control unit into a start-stop enabling state once the first brake and the second brake are both concurrently triggered, and when the control unit is in the start-stop enabling state, switching the control unit into an idling-stop state and controlling the fuel supplying device to stop supplying fuel to the engine once a vehicle status of the vehicle meets an idling-stop condition.

15. The control method as claimed in claim 14, wherein the idling-stop condition is met when the vehicle is in an idle speed status.

16. The control method as claimed in claim 14, wherein the idling-stop condition is met when:

an engine speed of the engine is smaller than an engine speed threshold for a predetermined time, a vehicle speed of the vehicle is smaller than a vehicle speed threshold for the predetermined time, a temperature of the engine is greater than an engine temperature threshold for a predetermined time, an opening degree of a nozzle of the fuel supplying device is smaller than a nozzle opening degree threshold for the predetermined time, and a voltage of a battery installed in the vehicle is greater than a battery voltage threshold.

17. The control method as claimed in claim 14, further comprising:

switching the control unit into a start standby state once the first brake and the second brake are both triggered, and switching the control unit into the regular state once the vehicle status of the vehicle meets an activating condition when the control unit is in the start standby state.

18. The control method as claimed in claim 17, wherein the activating condition is met when the vehicle is in a standstill status.

19. The control method as claimed in claim 17, wherein the activating condition is met when a vehicle speed of the vehicle is smaller than a vehicle speed threshold.

* * * * *